US008777202B2

(12) United States Patent
Herbold et al.

(10) Patent No.: US 8,777,202 B2
(45) Date of Patent: Jul. 15, 2014

(54) TOOL FOR ADJUSTING SEAL

(75) Inventors: John William Herbold, Fountain Inn, SC (US); Charles V. Spanos, Greenville, SC (US)

(73) Assignee: General Electric Company, Schenectady, NY (US)

( * ) Notice: Subject to any disclaimer, the term of this patent is extended or adjusted under 35 U.S.C. 154(b) by 636 days.

(21) Appl. No.: 13/111,431

(22) Filed: May 19, 2011

(65) Prior Publication Data

US 2012/0292859 A1 Nov. 22, 2012

(51) Int. Cl.

| | |
|---|---|
| ***B25B 1/20*** | (2006.01) |
| ***B25B 1/08*** | (2006.01) |
| ***B25B 5/08*** | (2006.01) |
| ***F01D 11/02*** | (2006.01) |
| ***F16J 15/44*** | (2006.01) |
| ***F16J 15/447*** | (2006.01) |
| ***B25B 27/00*** | (2006.01) |
| *B25B 11/02* | (2006.01) |

(52) U.S. Cl.
CPC .................................. *B25B 27/0092* (2013.01)
USPC .............. 269/40; 269/235; 277/411; 277/416

(58) Field of Classification Search
CPC .................................................. B25B 27/0092
USPC ................................ 254/25; 277/630; 173/90
See application file for complete search history.

(56) References Cited

U.S. PATENT DOCUMENTS

| | | | | |
|---|---|---|---|---|
| 4,387,004 | A * | 6/1983 | Prins | 202/248 |
| 4,747,197 | A * | 5/1988 | Charron | 29/235 |
| 4,804,196 | A * | 2/1989 | Readman | 277/380 |
| 5,109,739 | A * | 5/1992 | Hull et al. | 81/463 |
| 5,125,796 | A * | 6/1992 | Cromer | 415/174.2 |
| 5,601,404 | A * | 2/1997 | Collins | 415/173.7 |
| 5,934,687 | A | 8/1999 | Bagepalli et al. | |
| 5,945,606 | A * | 8/1999 | Tokunaga et al. | 73/756 |
| 6,162,014 | A | 12/2000 | Bagepalli et al. | |
| 6,637,751 | B2 * | 10/2003 | Aksit et al. | 277/416 |
| 6,637,752 | B2 * | 10/2003 | Aksit et al. | 277/416 |
| 6,880,217 | B2 * | 4/2005 | Garst | 29/235 |
| 7,600,305 | B2 * | 10/2009 | Ploeger et al. | 29/235 |
| 8,398,090 | B2 * | 3/2013 | McMahan et al. | 277/644 |
| 8,562,000 | B2 * | 10/2013 | Moehrle et al. | 277/644 |
| 2002/0121744 | A1 * | 9/2002 | Aksit et al. | 277/411 |
| 2003/0039542 | A1 | 2/2003 | Cromer | |
| 2004/0013522 | A1 * | 1/2004 | Burdgick | 415/230 |
| 2005/0169749 | A1 * | 8/2005 | Coulon et al. | 415/170.1 |
| 2007/0045582 | A1 * | 3/2007 | Anderson et al. | 251/214 |
| 2009/0053055 | A1 * | 2/2009 | Cornett et al. | 415/208.2 |

* cited by examiner

*Primary Examiner* — Lee D Wilson
*Assistant Examiner* — Alvin Grant
(74) *Attorney, Agent, or Firm* — Dority & Manning, PA

(57) ABSTRACT

A tool is disclosed for adjusting a seal. The tool includes an engagement block. The engagement block defines a slot configured to capture a portion of the seal. The tool further includes an impact surface connected to the engagement block, and a hammer head movable along a strike axis with respect to the engagement block and configured for striking the impact surface. Striking of the impact surface with the hammer head can cause movement of the seal.

18 Claims, 6 Drawing Sheets

TOOL FOR ADJUSTING SEAL

FIELD OF THE INVENTION

The present disclosure relates in general to seals, and more particularly to tools and methods for adjusting the seals.

BACKGROUND OF THE INVENTION

Turbine systems are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

Seals are generally utilized within turbine systems between various components of the turbine system to prevent leakage between the components, such as from regions of higher pressure to regions of lower pressure. For example, side seals are utilized between transition piece aft frames in combustor sections to prevent compressor discharge air leakage between the aft frames and into the gas path. However, many seals frequently require adjustment. For example, after operation, the seals may require cleaning, modification, or replacement, and must thus be removed from between the adjacent components.

Currently, seals are adjusted by using various existing tools, such as hammers, crow bars, and pliers, to crudely pry the seals from between the adjacent components. However, in many cases, the seals may be difficult to reach. For example, in the case of side seals between aft frames, there is relatively little access space for a worker to reach the seals for adjustment, due to the close proximity of transition pieces and other components, such as casings, to one another. Thus, it is difficult or impossible to utilize existing tools to remove the seals. For example, the existing tools may have to be utilized blindly due to the relatively little access space, which often results in unintended damage to the seals and/or other components of the system.

Thus, an improved tool and method for adjusting a seal in a turbine system are desired in the art. For example, a tool and method that allow for adjustment of a seal in a location with relatively little access space would be advantageous. Further, a tool and method that do not require the use of additional tools would be advantageous.

BRIEF DESCRIPTION OF THE INVENTION

Aspects and advantages of the invention will be set forth in part in the following description, or may be obvious from the description, or may be learned through practice of the invention.

In one embodiment, a tool is disclosed for adjusting a seal in a turbine system. The tool includes an engagement block. The engagement block defines a slot configured to capture a portion of the seal. The tool further includes an impact surface connected to the engagement block, and a hammer head movable along a strike axis with respect to the engagement block and configured for striking the impact surface. Striking of the impact surface with the hammer head can cause movement of the seal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
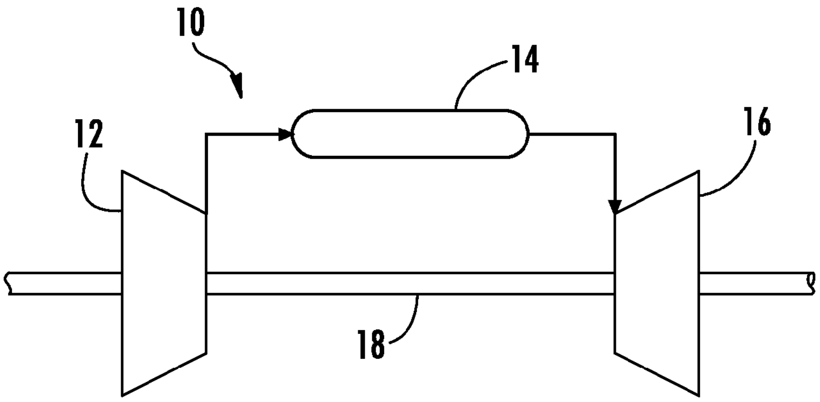
FIG. 1 is a schematic illustration of one embodiment of a turbine system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a turbine system 10. The system 10 may include a compressor section 12, a combustor section 14, and a turbine section 16. The compressor section 12 and turbine section 16 may be coupled by a shaft 18. The shaft 18 may be a single shaft or a plurality of shaft segments coupled together to form shaft 18. It should be understood that the turbine system according to the present disclosure may be a gas turbine system, a steam turbine system, or any other suitable turbine system.

Figure 2:
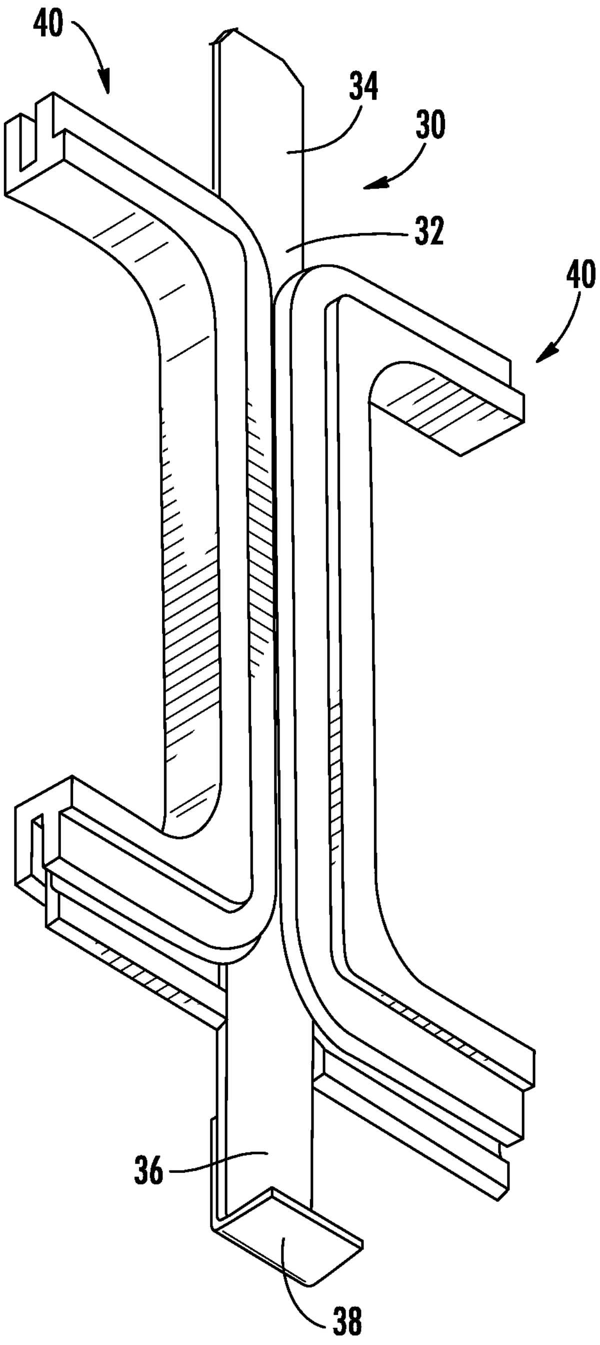
FIG. 2 is a partial perspective view of a seal between two adjacent aft frames according to one embodiment of the present disclosure.
Figure 5:
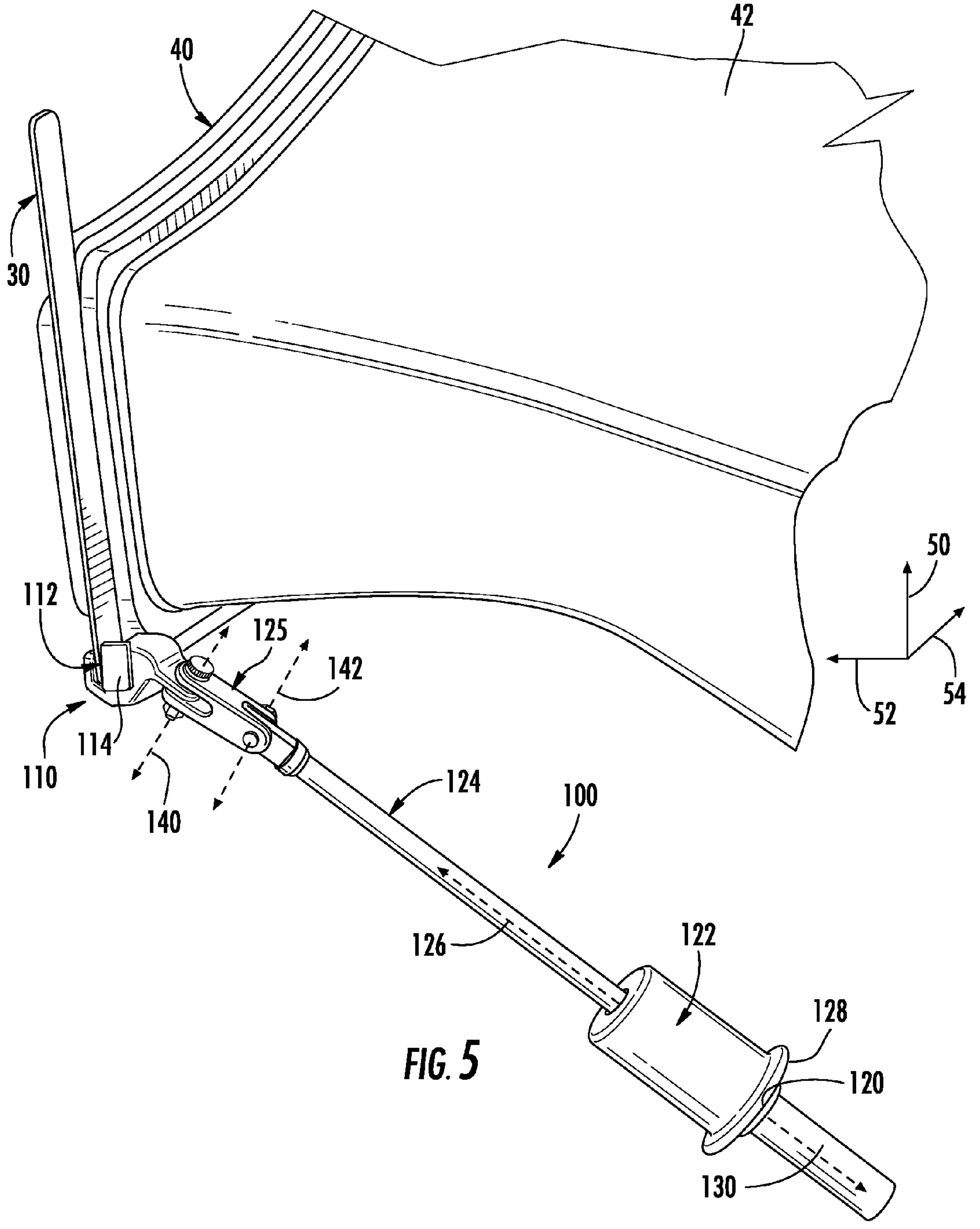
FIG. 5 is a perspective view of a tool capturing a seal according to one embodiment of the present disclosure.
Figure 6:
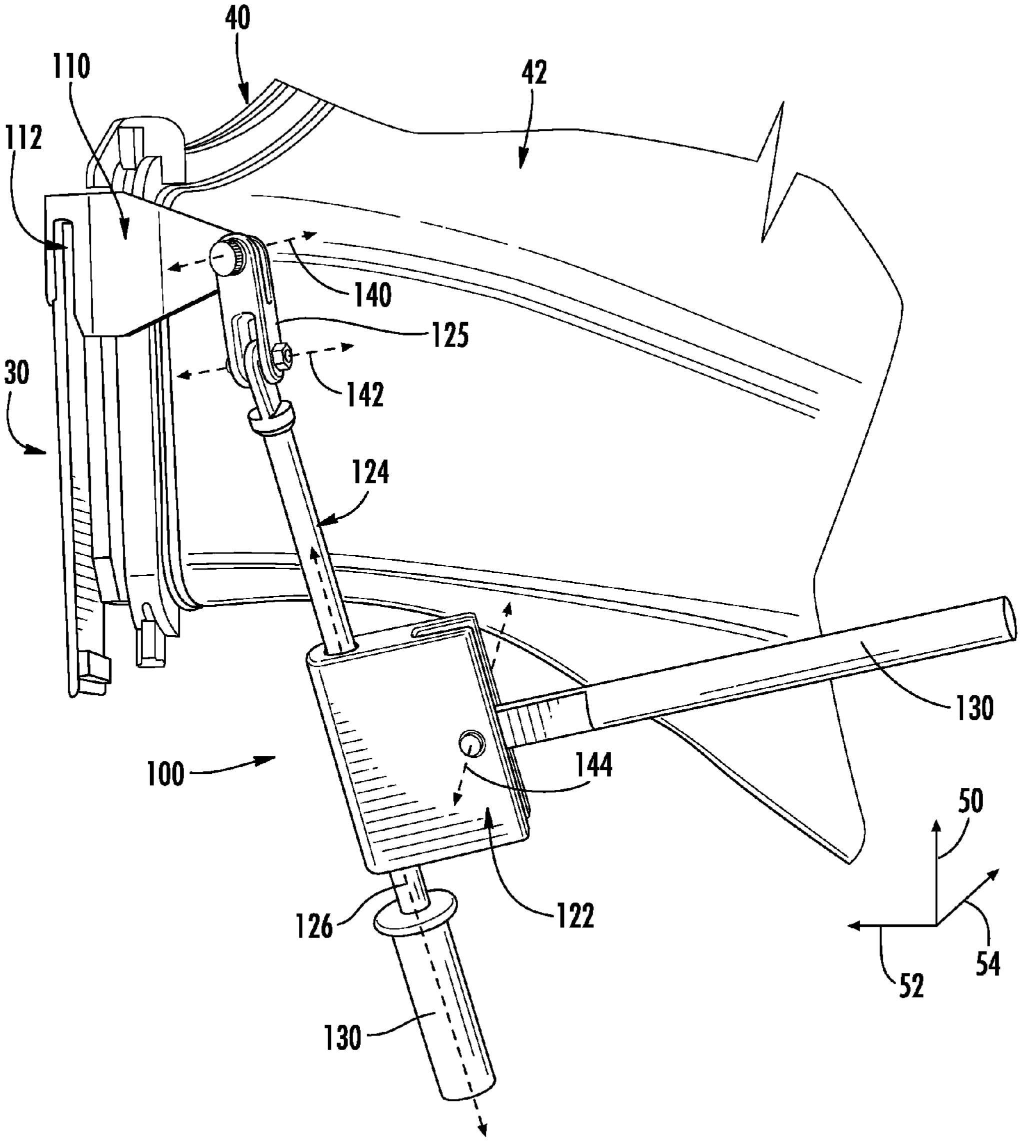
FIG. 6 is a perspective view of a tool capturing a seal according to another embodiment of the present disclosure.

As shown in FIGS. 2, 5, and 6, seals 30 are frequently utilized between various components of the system 10, such as in a compressor 12, combustor 14, and/or turbine 16, or in any other suitable locations. The seals 30 may have any shape and size suitable for providing a seal between the adjacent components. For example, in some embodiments as shown, the seals 30 may include a body 32 extending between a first end 34 and a second end 36. The body 32 may be generally planer, as shown. The first end 34 and/or the second end 36 may be generally planer, and/or may include a bracket portion 38 or other suitable feature extending generally inwardly or outwardly from a generally planer surface.

As shown, FIGS. 2, 5, and 6 illustrate one embodiment of a seal 30 between adjacent components. In these embodiments, the components are adjacent aft frames 40 mounted to transition pieces 42 (only one of each of which is shown in FIGS. 5 and 6, for illustrative purposes) in a combustor section 14. The seal 30 as shown is one embodiment of a side seal disposed between the adjacent aft frames 40. The seal includes a body 32 extending between a first end 34 and a second end 36. The second end 36 further includes a bracket portion 38 extending therefrom. The first end 34 is positioned radially inwardly of the second end 36 along a radial axis 50, and the bracket portion 38 extends outwardly along a longitudinal axis 52. Additionally, a tangential axis 54 extends generally perpendicular to the radial axis 50 and the longitudinal axis 52.

It should be understood, however, that the present disclosure is not limited to side seals between aft frames 40, and rather that any suitable seals 30 are within the scope and spirit of the present disclosure.

Before, during, or after operation of the system 10, a seal 30 may require adjustment with respect to the adjacent components. For example, the seal 30 may require cleaning, modification, or replacement, and thus must be removed from between the adjacent components. Additionally or alternatively, the seal 30 may need to be moved with respect to the adjacent components. Further, in many cases, the seal 30 may be difficult to reach, and/or may require the use of tools, rather than hand-force, to adjust. For example, in the case of side seals between aft frames 40, there is relatively little access space for a worker to reach the seals for adjustment, due to the close proximity of the transition pieces 42 and other components, such as casings, to one another.

Thus, the present disclosure is directed to a tool 100 for adjusting a seal 30 in a turbine system 10. Various embodiments of the tool 100 are shown in FIGS. 3 through 6. The tool 100 advantageously allows for adjustment of a seal 30 in a location with relatively little access space, and further requires no additional tools for adjustment of the seal.

Figure 3:
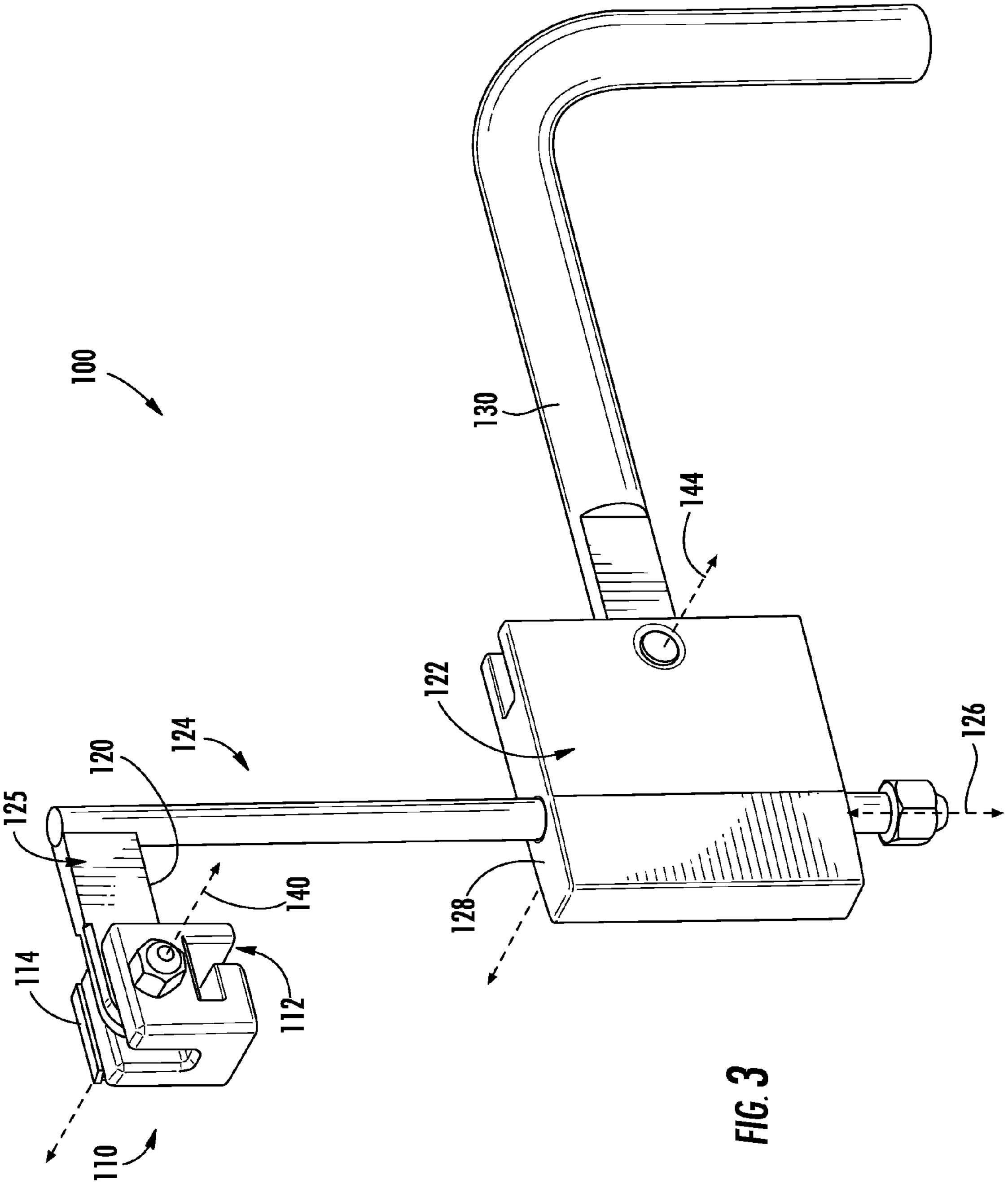
FIG. 3 is a perspective view of a tool according to one embodiment of the present disclosure.
Figure 4:
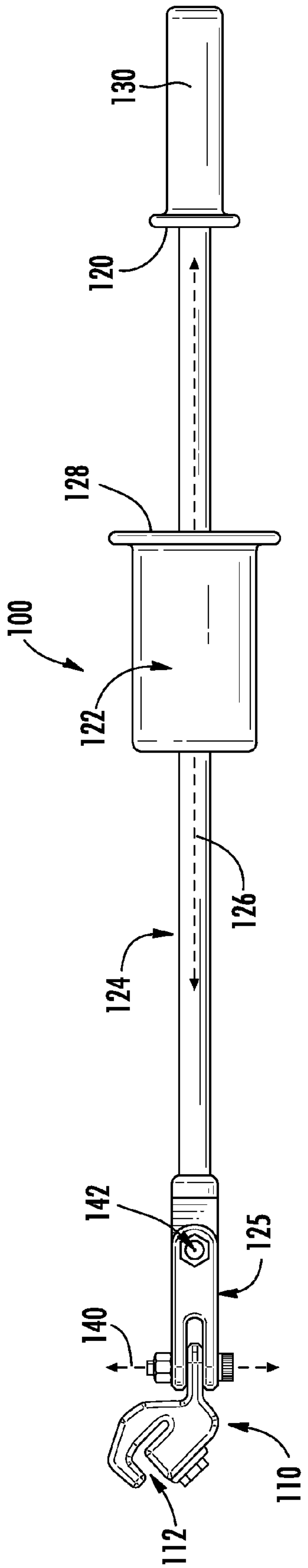
FIG. 4 is a perspective view of a tool according to another embodiment of the present disclosure.

As shown, the tool 100 may include an engagement block 110. The engagement block defines a slot 112 therein, which is configured to capture a portion of the seal 30. For example, the slot 112 may have a size and shape similar to the size and shape of the first end 34 or second end 36 of a seal 30, such that the slot 112 may slide onto that end and thus capture that end of the seal 30. FIGS. 3 through 5 illustrate generally L-shaped slots 112. These slots 112 are configured for capturing an end of a seal 30 with a bracket portion 38 extending therefrom. Thus, the slots 112 may be sized to slide onto the end of the seal 30 and receive the end and bracket portion 38 therein. FIG. 6 illustrates a planer slot 112. This slot 112 is configured for capturing a generally planer end of a seal 30 without any features extending therefrom. Thus, the slot 112 may be sized to slide onto the end of the seal 30 and receive the end therein.

In some embodiments, the tool 100 may further include a stop plate 114. The stop plate 114 may be mounted to the engagement block 110 adjacent to the slot 112. The stop plate 114 prevents the portion of the seal 30 that is captured by the engagement block 110 from escaping. For example, a portion of a seal 30 may be captured by the slot 112 by sliding the slot 112 over the portion of the seal 30. The stop plate 114 may be mounted adjacent to one side of the slot 112, as shown, to prevent the seal 30 from sliding out of this side of the slot 112 and thus escaping capture by the engagement block 110.

Alternatively, the tool 100 may include any suitable apparatus for preventing the portion of the seal 30 that is captured by the engagement block 110 from escaping. For example, a screw, dowel pin, or other apparatus could be mounted in the place of the stop plate 114. In other alternative embodiments, the slot 112 may be a partial slot, with one end blocked to prevent the portion of the seal 30 that is captured from sliding through the slot 112.

As shown, the tool 100 may further include an impact surface 120 and a hammer head 122. The impact surface 120 may be connected to the engagement block 110. For example, in some embodiments as shown, a slide rod 124 may connect the engagement block 110 and the impact surface 120. The slide rod 124 may have any suitable cross-sectional shape. For example, the slide rod 124 may have a generally circular or oval cross-sectional shape, a generally square or rectangular shape, a generally triangular shape, or any other suitable polygonal shape. Alternatively, any suitable device or apparatus may connect the engagement block 110 and the impact surface 120. Further, in some embodiments, a pivot arm 125 may be positioned between the engagement block 110 and the slide rod 124. The pivot arm 125 may extend from the slide rod 124, and may be fixed or pivotal with respect to the slide rod 124 as discussed below.

The hammer head 122 may be movable along a strike axis 126 with respect to the engagement block 110 and configured for striking the impact surface 120. For example, in some embodiments as shown, the slide rod 124 may define the strike axis 126. In other words, the strike axis 126 may be the longitudinal axis of the slide rod 124. Further, the hammer head 122 may be slidably mounted to the slide rod 124. Thus, the hammer head 122 may be slidingly movable along the slide rod 124, such as along the strike axis 126. Alternately, however, the hammer head 122 may be movable along any suitable strike axis 126, such as a linear axis, as shown, or a curvilinear or other suitable axis. For example, in some embodiments, the slide rod 124 may be curvilinear and may thus define a curvilinear strike axis 126, and the hammer head 122 may be movable along this strike axis 126.

Further, the hammer head 122 may be configured for striking the impact surface 120. For example, the hammer head 122 may include a hammer surface 128. The hammer surface 128 is the surface of the hammer head 122 that generally faces the impact surface 120 and at least a portion of which may contact the impact surface 120 when the hammer head strikes the impact surface 120. Further, the impact surface 120 may be positioned in the path of the strike axis 126, so that the hammer head 122 moving along the strike axis 126 will impact the impact surface 120. Thus, to strike the impact surface 120, the hammer head 122 may be moved towards the impact surface 120 until the hammer surface 128 contacts the impact surface 120.

Striking of the impact surface 120 with the hammer head 122 may generally cause movement of the seal 30, thus adjusting the seal 30 with respect to the adjacent components. For example, force applied to the impact surface 120 by the hammer head 122 may be translated through the connection between the impact surface 120 and the engagement block 110 to the engagement block 110, and then further translated from the engagement block 110 to the seal 30. Thus, when the hammer head 122 strikes the impact surface 120, the force of the strike may be applied to the seal 30 in the direction of the impact along the strike axis 126, causing the seal 30 to move in this general direction. In embodiments wherein the seal 30 is a side seal between adjacent aft frames 40, as discussed above and shown in FIGS. 2, 4, and 5, the seal 30 may be adjusted generally along the radial axis 50. Striking of the impact surface 120 may be repeated as necessary to adjust the seal 30, such as to remove the seal 30 from between the adjacent components.

In some embodiments, the tool 100 may further include a handle 130 or a plurality of handles 130. For example, FIGS.

3 and 6 illustrate a handle connected to the hammer head 122. This handle 130 may be utilized to grip the tool 100 and/or to move the hammer head 122, as discussed above. FIGS. 4 through 6 illustrate a handle connected to the slide rod 124. This handle 130 may be utilized to grip the tool 100.

Various components of the tool 100 may be pivotable or rotatable about various axes, in order to allow the tool 100 to be manipulated and adjusted in locations with relatively little access space. For example, in some embodiments, the engagement block 110 may be pivotable about a pivot axis 140, as shown. The pivot axis 140 may be defined at the connection between the engagement block 110 and the component that the engagement block 110 is connected to, such as the pivot arm 125, as shown in FIGS. 3 through 6, or the slide rod 124.

Further, the pivot arm 125, if included, may be pivotable about a pivot axis 142, as shown. The pivot axis 142 may be defined at the connection between the pivot arm 124 and the engagement block 110, as shown in FIGS. 4 through 6.

The hammer head 122 may, in some embodiments, be rotatable about the strike axis 126. For example, in embodiments wherein the strike axis 126 is defined by the slide rod 124, the hammer head 122 may be rotatable about the slide rod 124. Thus, the hammer head 122 may in these embodiments be both movable along and rotatable about the strike axis 126.

A handle 130 may, if included, be pivotable about a pivot axis 144, as shown. The pivot axis 144 may be defined at the connection between the handle 130 and the component that the handle 130 is connected to, such as the hammer head 122, as shown in FIG. 3, or the slide rod 124.

The present disclosure is further directed to a method for adjusting a seal 30 in a turbine system 10. The method may include, for example, the step of capturing a portion of the seal 30. This portion of the seal 30 may be captured within an engagement block 110 of a tool 100, as discussed above. The method may further include the step of pivoting the tool 100 about at least one axis, such as a pivot axis 140, 142, and/or 144, as discussed above. The method may further include the step of rotating the tool 100 about at least one axis, such as about a strike axis 126 as discussed above. The method may further include striking an impact surface 120 of the tool 100. The impact surface 120 may be struck with a hammer head 122, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tool for adjusting a seal, the tool comprising:
- an engagement block, the engagement block defining a slot configured to capture a portion of the seal;
- an impact surface connected to the engagement block; and
- a hammer head movable along a strike axis with respect to the engagement block and configured for striking the impact surface,
- wherein striking of the impact surface with the hammer head can cause movement of the seal; and
- wherein the engagement block is pivotable about a pivot axis.

2. The tool of claim 1, further comprising a slide rod connecting the engagement block and the impact surface.

3. The tool of claim 2, wherein the slide rod defines the strike axis, and wherein the hammer head is slidably mounted to the slide rod.

4. The tool of claim 2, further comprising a pivot arm connecting the engagement block and the slide rod.

5. The tool of claim 1, wherein the hammer head is rotatable about the strike axis.

6. The tool of claim 1, wherein the strike axis is a linear strike axis.

7. The tool of claim 1, further comprising a handle connected to the hammer head.

8. The tool of claim 7, wherein the handle is pivotable about a pivot axis.

9. The tool of claim 1, further comprising a stop plate mounted to the engagement block adjacent to the slot.

10. An adjustment system, the adjustment system comprising:
- a seal disposed between adjacent components; and
- a tool for adjusting the seal with respect to the adjacent components, the tool comprising:
- an engagement block, the engagement block defining a slot configured to capture a portion of the seal;
- an impact surface connected to the engagement block; and
- a hammer head movable along a strike axis with respect to the engagement block and configured for striking the impact surface,
- wherein striking of the impact surface with the hammer head can cause movement of the seal with respect to the adjacent components; and
- wherein the adjacent components are adjacent transition piece aft frames, and wherein the seal is a side seal disposed therebetween.

11. The adjustment system of claim 10, further comprising a slide rod connecting the engagement block and the impact surface.

12. The adjustment system of claim 11, wherein the slide rod defines the strike axis, and wherein the hammer head is slidably mounted to the slide rod.

13. The adjustment system of claim 11, further comprising a pivot arm connecting the engagement block and the slide rod.

14. The adjustment system of claim 10, wherein the engagement block is pivotable about a pivot axis.

15. The adjustment system of claim 10, wherein the hammer head is rotatable about the strike axis.

16. The adjustment system of claim 10, further comprising a handle connected to the hammer head.

17. The adjustment system of claim 16, wherein the handle is pivotable about a pivot axis.

18. The adjustment system of claim 10, further comprising a stop plate mounted to the engagement block adjacent to the slot.

* * * * *